United States Patent [19]

Black et al.

[11] 3,759,944

[45] Sept. 18, 1973

[54] ISOTHIOUREAS AND THEIR DERIVATIVES

[75] Inventors: James Whyte Black, Hempstead; Graham John Durant, Welwyn Garden City; John Colin Emmett, Kimpton; Charon Robin Ganellin, Welwyn Garden City, all of England

[73] Assignee: Smith Kline & French Laboratories Limited, Welwyn Garden City, England

[22] Filed: Oct. 14, 1970

[21] Appl. No.: 80,818

[52] U.S. Cl............ 260/309, 260/294.8, 260/308 R, 260/309.6, 260/311, 260/345.9, 424/263, 424/269, 424/273
[51] Int. Cl.. C07d 49/18, C07d 49/36, C07d 55/06
[58] Field of Search................. 260/309, 310, 294.8, 260/308, 309.6, 311

[56] References Cited
UNITED STATES PATENTS
3,558,640   1/1971   Shen et al. ......................... 260/309

OTHER PUBLICATIONS

Schneider, Chem. Abstracts, Vol. 67, Item 105488 (1967)
Schneider et al., Chem. Abstracts, Vol. 70, Item 29286 (Feb. 17, 1969)
Baver et al., S. Am. Chem. Soc., Vol. 26, P. 82–85 (1961)

Primary Examiner—Harry I. Moatz
Attorney—William H. Edgerton, Richard D. Foggio, Joan S. Keps, Alan D. Lourie and Joseph A. Marlino

[57] ABSTRACT

S-(Heterocyclic-alkyl)isothioureas and a method of inhibiting histamine activity.

5 Claims, No Drawings

ISOTHIOUREAS AND THEIR DERIVATIVES

This invention relates to isothioureas and their derivatives which have pharmacological activity. Normally these compounds exist as the addition salts but for convenience reference will be made throughout this specification to the parent compounds. This invention also relates to a method of inhibiting histamine activity.

It has for long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated by Ash and Schild (*Brit. J. Pharmac. Chemother.* 27:427, 1966) as H–1. The isothiourea compounds of this invention and the isothiourea compounds used in the method of this invention are distinguished by the fact that they act at histamine receptors other than the H–1 receptor. Thus they are of utility in inhibiting certain actions of histamine which are not inhibited by the above-mentioned "antihistamines."

The present invention provides isothioureas of the following general Formula I, in which it will be understood that the structure of the nucleus is such that the bond between the carbon and nitrogen atoms might equally well be represented as a double bond:

FORMULA I

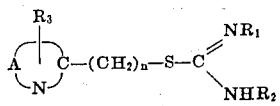

in which:

$n$ is two to four;

A is a chain of three to four atoms of which one to two atoms are nitrogen and the remainder are carbon which forms an unsaturated ring with the carbon and nitrogen atoms to which it is attached;

$R_1$ is hydrogen or lower alkyl having one to three carbon atoms;

$R_2$ is hydrogen, lower alkyl having one to three carbon atoms, amino or benzyl or $R_1$ and $R_2$ together form an ethylene bridge and $R_3$ is hydrogen, halo or benzyl, except that when $n$ is two or three, A is imidazole only when $R_1$ and $R_2$ are both other than hydrogen, and pharmaceutically acceptable acid addition salts thereof.

As used herein, the term "lower alkyl" means an alkyl group containing from one to three carbon atoms. Preferably the unsaturated ring formed by A and the carbon and nitrogen atoms to which it is attached is imidazole and the alkylisothiourea side chain is most preferably attached thereto at the 4(5) position. $R_3$ is preferably hydrogen.

Compounds which are particularly useful are N,N'-dimethyl-S-[2-(4(5)-imidazolyl)ethyl]isothiourea and S-[4-(4(5)-imidazolyl)butyl]isothiourea.

The method of inhibiting histamine activity according to this invention comprises administering internally to animals in an amount sufficient to produce said activity a compound of the formula:

FORMULA II

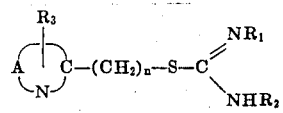

in which:

$n$ is two to four;

A is a chain of three to four atoms of which one to two atoms are nitrogen and the remainder are carbon which forms an unsaturated ring with the carbon and nitrogen atoms to which it is attached;

$R_1$ is hydrogen or lower alkyl having one to three carbon atoms;

$R_2$ is hydrogen, lower alkyl having one to three carbon atoms, amino or benzyl or $R_1$ and $R_2$ together form an ethylene bridge and $R_3$ is hydrogen, halo or benzyl, and pharmaceutically acceptable acid addition salts thereof.

A very suitable process for the production of the compounds of Formulas I and II comprises reacting omega substituted alkyl compounds of the following general Formula III.

FORMULA III

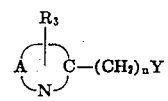

wherein Y is a suitable "leaving" group such as hydroxyl or a halogen and $n$, A and $R_3$ have the same significance as in Formula II, with a thiourea of the formula

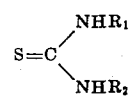

wherein $R_1$ and $R_2$ have the same significance as in Formula II.

In the case where Y is a halogen the reaction may be carried out in a suitable solvent, for example in ethanol, and in the case where Y is hydroxyl then the reaction may be carried out in an aqueous solution of a strong acid such as hydrogen bromide. This reaction of course normally results in the production of the corresponding strong acid salt, for example with hydrogen bromide or hydrogen chloride. The free base may be readily obtained from this salt by methods known in the art, for example by ion-exchange chromatography, which method may also be used for the conversion of one salt to another. Also, one salt may be converted to another by double decomposition which is well known to the art.

A method which may be used for the production of certain compounds of Formula III wherein Y is hydroxyl involves the reduction with lithium aluminium hydride in a suitable solvent such as ether or tetrahydrofuran of the corresponding substance of Formula III wherein n is one unit less and Y is carbethoxy.

The compounds of Formula II may be combined with a pharmaceutically acceptable carrier to form pharmaceutical compositions. Pharmaceutical compositions comprising the substance S-[2-(4(5)-imidazolyl)ethyl]isothiourea are amongst those which are most preferred. Advantageously the composition will be made up in dosage unit form appropriate to the desired mode of administration. The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. The acid addition salts of Formula II are generally water soluble. Other pharmacologically active compounds may in certain cases be included in the pharmaceutical compositions.

As stated above, the isothioureas of the present invention and of the method of the present invention have been found to have pharmacological activity in the animal body as antagonists to certain actions of histamine which are not blocked by "antihistamines" such as mepyramine. For example, they have been found to inhibit selectively the histamine-stimulated secretion of gastric acid from the lumen-perfused stomachs of rats anaesthetised with urethane, at doses from 8 to 256 micromoles per kilogram. Similarly, the action of these compounds may, in many cases, be demonstrated by their antagonism to the effects of histamine or other tissues which, according to the above-mentioned paper of Ash and Schild, are not H–1 receptors. Examples of such tissues are perfused isolated guinea-pig heart, isolated guinea-pig right atrium and isolated rat uterus.

The invention is illustrated but in no way limited by the following examples.

EXAMPLE 1

Preparation of S-[2-(4(5)-imidazolyl)ethyl]isothiourea dihydrobromide

A solution of 4(5)-(2-hydroxyethyl)imidazole (6.0 g.) and thiourea (4.1 g.) in 48 percent aqueous hydrobromic acid (37 ml.) is heated under reflux for 17 hours. Following evaporation to dryness, the solid residue is recrystallized from isopropyl alcohol-ethanol-ether, yielding S-[2-(4(5)-imidazolyl)ethyl]isothiourea dihydrobromide, m.p. 208°–212° C. Recrystallization from the same solvents yields pure product, m.p. 210°–212° C.

EXAMPLE 2

Preparation of S-[2-(4(5)-imidazolyl)ethyl]isothiourea dihydrochloride

A solution of 4(5)-(2-chloroethyl)imidazole hydrochloride (6.6 g.) and thiourea (3 g.) in ethanol (98 percent, 50 ml.) is heated under reflux for 3 hours, treated with charcoal and filtered. Addition of ethyl acetate gives the product, m.p. 205.5°–207° C. Additional material (m.p. 203°–207° C.) is obtained from the mother liquors. Recrystallization from ethanol gives pure dihydrochloride, m.p. 205.5°–207° C.

EXAMPLE 3

Preparation of N,N'-dimethyl-S-[2-(4(5)-imidazolyl)ethyl]-isothiourea dihydrobromide A mixture of 4(4)-(2-hydroxyethyl)imidazole (2.24 g.), N,N'-dimethylthiourea (2.04 g.) and 48 percent aqueous hydrobromic acid (12 ml.) are caused to react in a manner similar to that described in Example 1. The pure product, m.p. 203°–204° C. is obtained by recrystallization from absolute alcohol.

EXAMPLE 4

Preparation of N-methyl-S-[2-(4(5)-imidazolyl)ethyl]isothiourea dihydrobromide

A mixture of 4(5)-(2-hydroxyethyl)imidazole (2.24 g.), N-methylthiourea (1.80 g.) and 48 percent aqueous hydrobromic acid (10 ml.) are caused to react in a manner similar to that described in Example 1. The pure product, m.p. 180°–181° C., is obtained by recrystallization from methanol-ethanol-isopropyl alcohol.

EXAMPLE 5

Preparation of N,N'-diethyl-S-[2-(4(5)-imidazolyl)ethyl]isothiourea dinitrate

A mixture of 4(5)-(2-hydroxyethyl)imidazole (3.36 g.), N,N'-diethylthiourea (3.97 g.) and 48 percent aqueous hydrobromic acid (18 ml.) are caused to react in a manner similar to that described in Example 1. The product from the reaction is converted into a nitrate salt by treatment with aqueous silver nitrate. Recrystallization from ethanol-ethyl acetate yields N,N'-diethyl-S-]2-(4(5)-imidazolyl)ethyl]isothiourea dinitrate, m.p. 96°–97° C.

EXAMPLE 6

Preparation of S-[2-(4(5)-imidazolyl)ethyl]isothiosemicarbazide dihydrobromide

A solution of 4(5)-(2-hydroxyethyl)imidazole (20 g.) in 49 percent aqueous hydrobromic acid (300 ml.) is heated under reflux for 48 hours. Concentration, followed by recrystallization from ethanol-ether affords 4(5)-(2-bromoethyl)imidazole hydrobromide, m.p. 149°–150° C.

A solution of 4(5)-(2-bromoethyl)imidazole hydrobromide (10.0 g.) and thiosemicarbazide (3.6 g.) in ethanol (170 ml.) is heated under reflux for 24 hours. Concentration and cooling gives S-[2-(4(5)-imidazolyl)ethyl]isothiosemicarbazide dihydrobromide, m.p. 170°–173° C.

EXAMPLE 7

Preparation of S-[4-(4(5)-imidazolyl)butyl]isothiourea dihydrobromide

4-[4(5)-Imidazolyl] butyric acid hydrochloride (72.0 g.) is esterified using a solution of gaseous hydrogen chloride in ethanol (14.5 percent). The solution is heated under reflux for 18 hours in the presence of a molecular sieve contained in a Soxhlet apparatus. Concentration affords the ethyl ester hydrochloride (78.2 g.) which is converted into the base by dissolving in absolute alcohol (200 ml.) and neutralizing with a solution prepared from sodium (7.93 g.) in alcohol (250 ml.). Following removal of inorganic material the crude ester base (54.7 g.) is isolated and used without further purification. This ester is dissolved in anhydrous tetrahydrofuran (700 ml.) and added slowly to a stirred suspension of lithium aluminium hydride (46.6 g.) in anhydrous tetrahydrofuran (220 ml.). Stirring is continued at room temperature for 17 hours, whereupon water (84 ml.) is slowly added, followed by the application of moderate heat for 15 minutes. The solid present is removed by filtration and extracted three times with hot tetrahydrofuran. The combined extracts are evaporated, affording 4(5)-(4-hydroxybutyl)imidazole (23 g.), a sample of which is converted into an oxalate salt, m.p. 104°–106° C.

A mixture of 4(5)-(4-hydroxybutyl)imidazole (2.24 g.), thiourea (1.22 g.) and 48 percent aqueous hydrobromic acid (10 ml.) is caused to react in a manner similar to that described in Example 1. The initial product obtained (m.p. 110°–115° C.) is recrystallized from methanol-nitromethane-ethyl acetate affording S-[4-(4(5)-imidazolyl)butyl]isothiourea dihydrobromide in three crops: 1.1 g. m.p. 113°–114° C.; 0.4 g. m.p. 109°–113° C.; 0.6 g. m.p. 110°–112° C.

EXAMPLE 8

Preparation of S-[3-(1-benzyl-2-imidazolyl)propyl]isothiourea dihydrochloride

A solution of 1-benzyl-2-(2-carbethoxyethyl)imidazole (5.2 g.) in dry ether (150 ml.) is added, dropwise, to a stirred suspension of aluminium lithium hydride (1.0 g.) in dry ether (150 ml.) at gentle reflux. The suspension is subsequently heated under reflux for 2 hours, and then cooled during the successive addition of water (1 ml.), 15 percent sodium hydroxide (1 ml.) and water (3 ml.). After heating under reflux for 0.5 hour and filtration, the insoluble solid is extracted with hot methanol (3×100 ml.). The combined organic extracts are concentrated under reduced pressure and the residue dissolved in 2N hydrochloric acid. Following extraction with chloroform, the solution is basified with solid potassium carbonate. Chloroform extracts of the basic solution are dried over sodium sulphate and concentrated under reduced pressure, affording 1-benzyl-2-(3-hydroxypropyl)imidazole as a colorless viscous liquid (4.6 g.). The carbinol (4.4 g.) is dissolved in benzene (40 ml.) and added to thionyl chloride (20 ml.) at reflux temperature. After complete addition, water (four drops) is added and the mixture is heated under reflux for 0.5 hour. Concentration followed by the addition of cyclohexane yields a yellow solid. Recrystallization from ethanol-ether yields 1-benzyl-2-(3-chloropropyl)imidazole hydrochloride, m.p. 162°–164° C.

A solution of 1-benzyl-2-(3-chloropropyl)imidazole hydrochloride (2.7 g.) and thiourea (0.76 g.) in absolute ethanol (25 ml.) is heated under reflux for 18 hours. Concentration followed by recrystallization from ethanol-ether affords S-[3-(1-benzyl-2-imidazolyl)propyl]isothiourea dihydrochloride as the monohydrate, m.p. 121°–123° C.

EXAMPLE 9

Preparation of S-[2-(3-(1,2,4-triazolyl)ethyl)]isothiourea dihydrobromide

A mixture of 3-(2-ethoxyethyl)-1,2,4-triazole (4.5 g.) and 48 percent aqueous hydrobromic acid (75 ml.) is heated under reflux for 24 hours. Following concentration under reduced pressure, the residue is dissolved in 48 percent aqueous hydrobromic acid (65 ml.). Thiourea (2.15 g.) is added and the resultant solution heated under reflux for 24 hours. The residue obtained following concentration is extracted with ethanol. The extracts are concentrated and triturated with isopropyl alcohol. The solid obtained is recrystallized from ethanol-isopropyl alcohol affording S-[2-(3-(1,2,4-triazolyl)ethyl)]isothiourea dihydrobromide, m.p. 169°–171° C. Additional product of slightly lower melting point is obtained from the mother liquors.

EXAMPLE 10

Preparation of S-[2-(2-pyridyl)ethyl]isothiourea dihydrobromide

A mixture of 2-(2-hydroxyethylpyridine (20.0 g.), thiourea (12.5 g.) and 48 percent aqueous hydrobromic acid (90 ml.) is caused to react in a manner similar to that described in Example 1. Recrystallization from methanol-isopropyl alcohol affords S-[2-(2-pyridyl)ethyl]isothiourea dihydrobromide, m.p. 229°–230° C.

EXAMPLE 11

Preparation of S-[3-(4(5)-imidazolyl)propyl]isothiourea dihydrobromide

A mixture of 4(5)-(3-hydroxypropyl)imidazole (2.52 g.), thiourea (1.52 g.) and 48 percent aqueous hydrobromic acid (14 ml.) is caused to react in a manner similar to that described in Example 1. Recrystallization from methanol-isopropyl alcohol affords S-[3-(4(5)-imidazolyl)propyl]isothiourea dihydrobromide, m.p. 235°–238° C. (dec.).

EXAMPLE 12

Preparation of 2-[(4(5)-imidazolyl)ethyl]thio-2-imidazoline dihydrobromide

A solution of 4(5)-(2-bromoethyl)imidazole hydrobromide (2.56 g.) and 2-mercapto-2-imidazoline (1.02 g.) in ethanol is heated under reflux for 24 hours. Concentration, followed by recrystallization from ethanol, gives 2-[(4(5)-imidazolyl)ethyl]-thio-2-imidazoline dihydrobromide, m.p. 227°–229° C.

EXAMPLE 13

Preparation of N-benzyl-S-[2-(4(5)-imidazolyl)ethyl]isothiourea dihydrobromide

A solution of 4(5)-(2-bromoethyl)imidazole hydrobromide (5.0 g.) and N-benzylthiourea (3.25 g.) in ethanol is heated under reflux for 24 hours. Concentration followed by repeated recrystallization from isopropyl alcohol-ether gives N-benzyl-S-[2-(4(5)-imidazolyl)ethyl]isothiourea dihydrobromide, m.p. 158°–168° C.

EXAMPLE 14

Preparation of S-[2-(3-pyrazolyl)ethyl]isothiourea dihydrobromide 4-(2-Tetrahydropyranyloxy)but-1-yne (50.0 g.) is added slowly (45 minutes) to a solution prepared from magnesium (9.3 g.) and ethyl bromide (45.5 g.) in ether (200 ml.), with stirring and concomitant distillation of ether. Dry benzene (150 ml.) is then added and the mixture is set aside for two hours with occasional agitation. Ethyl orthoformate (57.8 g.) is added in one portion and the mixture is heated under reflux for 20 hours. Following addition to ether (300 ml.) and ice-water (200 ml.) containing ammonium acetate (10 g.) the whole is filtered. The organic layer is separated, washed with saturated sodium carbonate solution (3×100 ml.) dried over sodium sulphate, concentrated and distilled, giving 2-(5,5-diethoxypent-3-ynyl)oxytetrahydropyrane, b.p. 124°–128° C./0.65 mm.

2-(5,5-Diethoxypent-3-ynyl)oxytetrahydropyrane (30.0 g.) is added slowly (20 minutes) to a solution of hydrazine hydrochloride (13.7 g.) in 50 percent aqueous ethanol (134 ml.). The temperature is maintained at below 45° C. during the addition, and the mixture is subsequently set aside at room temperature for 18 hours. Following the addition of sodium carbonate (10 g.), the reaction mixture is concentrated under reduced pressure. The residue is extracted with ethanol and the combined extracts are concentrated and distilled, giving 3-(2-hydroxyethyl)pyrazole (5.0 g.), b.p. 162°–164° C./0.3–0.4 mm. The picrate has m.p. 137.5°–138.5° C. (from ethanol).

A solution of 3-(2-hydroxyethyl)pyrazole (5.0 g.) and thiourea (3.4 g.) in 48 percent hydrobromic acid (60 ml.) is heated under reflux for 20 hours. Following concentration, the product is ultimately recrystallized from ethanol-water to give S-[2-(3-pyrazolyl)ethyl]isothiourea dihydrobromide, m.p. 194°–196° C.

EXAMPLE 15

Preparation of S-[2-(4(5)-bromo-5(4)-imidazolyl)ethyl]isothiourea dihydrochloride Silver sulphate (15.7 g.) and then bromine (5.4 ml.) are added to a solution of 4(5)-(2-chloroethyl)imidazole hydrochloride (8.4 g.) in concentrated sulphuric acid. The mixture is shaken continuously in the absence of light for four days and then filtered. The filtrate is added to water (2 l.), basified (pH9–10) with anhydrous sodium carbonate and concentrated. Methanol extracts of the residue are acidified with anhydrous hydrogen chloride. Following concentration and extraction of the residue with ethanol and further concentration, the residue is extracted with acetone. These extracts are treated with charcoal, concentrated (approximately 300 ml.) and diluted with ethyl acetate. The solid (2.9 g., m.p. 154° C.) obtained is dissolved in ethanol (500 ml.) containing thiourea (0.76 g.) and heated under reflux for 18 hours. The product is converted into the picrate (1.62 g., m.p. 194°–196° C.), which, following treatment with hydrochloric acid in the usual way, affords S-[2-(4(5)-bromo-5(4)-imidazolyl)ethyl]isothiourea dihydrochloride, m.p. 198°–199° C. (from ethanol-ethyl acetate).

EXAMPLE 16

Preparation of N,N'-dipropyl-S-[2-(4(5)-imidazolyl)ethyl]isothiourea dihydrobromide Reacting 4(5)-(2-hydroxyethyl)imidazole, N,N'-dipropylthiourea and 48 percent aqueous hydrobromic acid in a manner similar to that described in Example 1 gives the product.

What is claimed is:

1. A pharmaceutically acceptable acid addition salt of a compound of the formula:

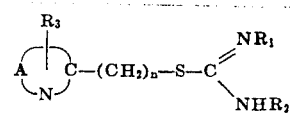

in which:
R₁ is hydrogen or lower alkyl having one to three carbon atoms;
R₂ is hydrogen, lower alkyl having one to three carbon atoms, amino or benzyl or R₁ and R₂ together form an ethylene bridge;
R₃ is hydrogen, halo or benzyl, R₃ being optionally halo or benzyl only when A taken together with the carbon and nitrogen atoms shown forms an imidazolyl ring and
n is two to four and A taken together with the carbon and nitrogen atoms shown forms an imidazolyl, 3-(1,2,4-triazolyl) or 3-pyrazolyl ring, except that when n is two or three, A is imidazolyl only when R₁ and R₂ are both other than hydrogen.

2. A compound according to claim 1 in which the ring formed by A taken together with the carbon and nitrogen atoms shown is imidazoly.

3. A compound according to claim 1 in which R₃ is hydrogen.

4. A compound according to claim 1 which is N,N'-dimethyl-S-[2-(4(5)-imidazolyl)ethyl]isothiourea dihydrobromide.

5. A compound according to claim 1 which is S-[4-(4(5)-imidazolyl)butyl]isothiourea dihydrobromide.

* * * * *

PO-1050
(5/69)

UNITED STATES PATENT OFFICE
CERTIFICATE OF CORRECTION

Patent No. 3,759,944     Dated September 18, 1973

Inventor(s) James Whyte Black, Graham John Durant, John Colin Emmett and Charon Robin Ganellin It is certified that error appears in the above-identified patent and that said Letters Patent are hereby corrected as shown below:

On the first page of the patent, in the left-hand column, between sections [21] and [52] insert

[30] Foreign Application Priority Data

October 29, 1969   Great Britain   52890/69

Signed and sealed this 18th day of June 1974.

(SEAL)
Attest:

EDWARD M. FLETCHER, JR.
Attesting Officer

C. MARSHALL DANN
Commissioner of Patents